June 15, 1954
O. E. MILLER
2,681,148
WATER SOFTENING APPARATUS
Filed April 16, 1951
3 Sheets-Sheet 1
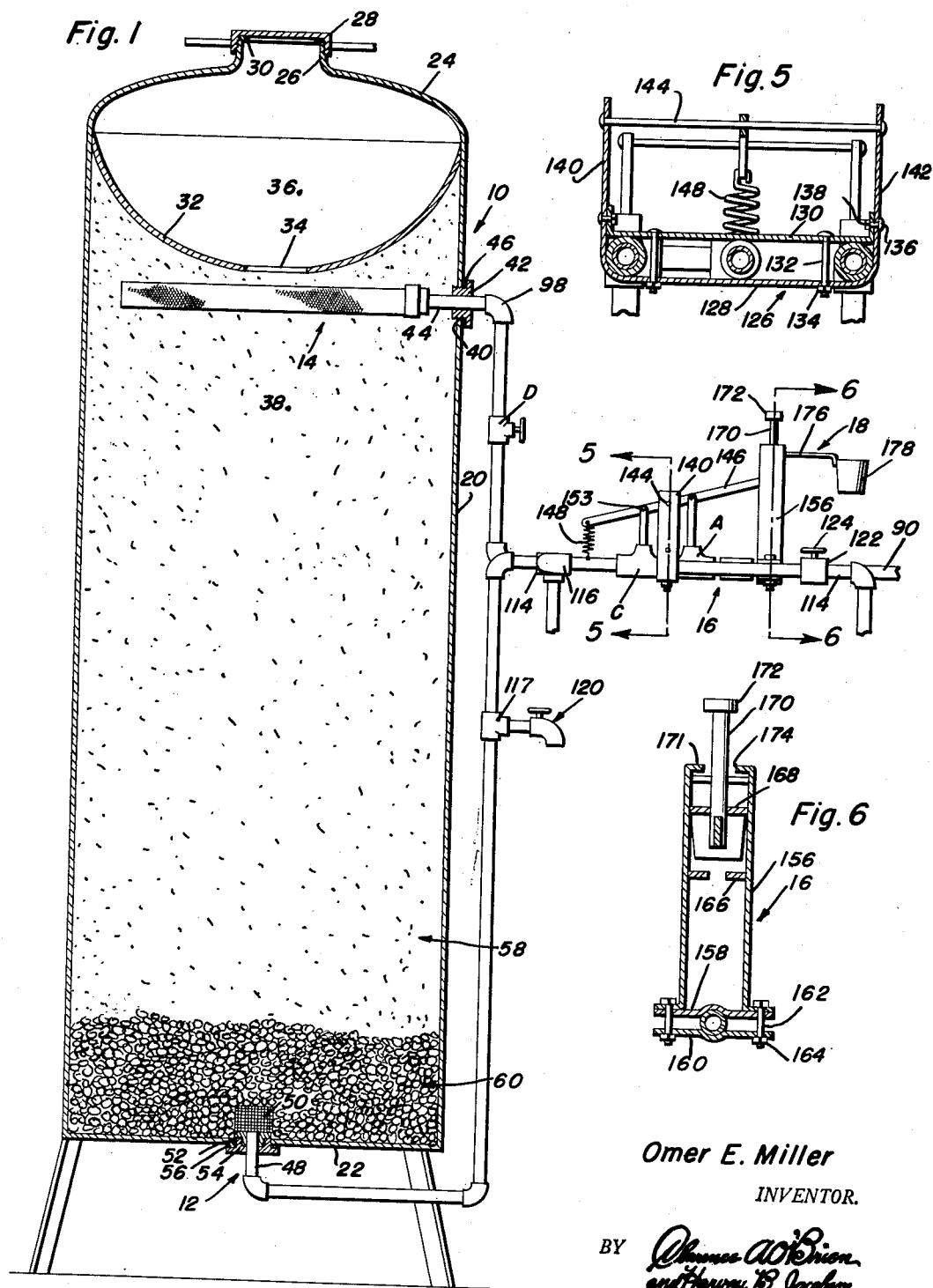
Omer E. Miller
INVENTOR.
BY
Attorneys

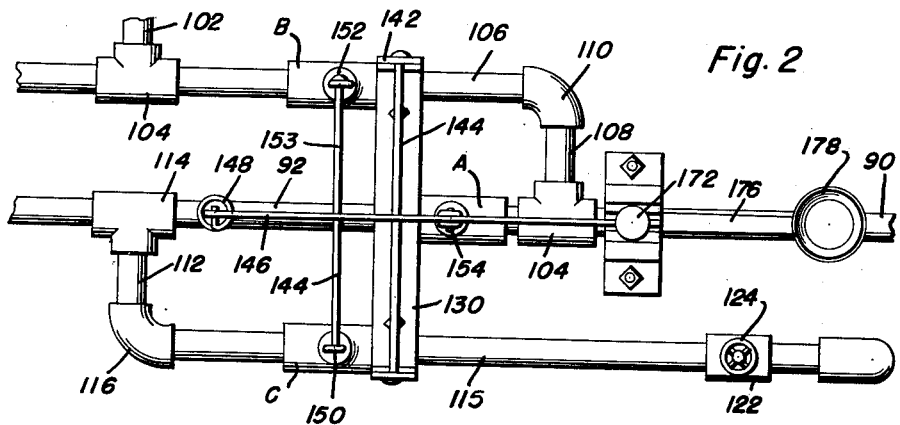
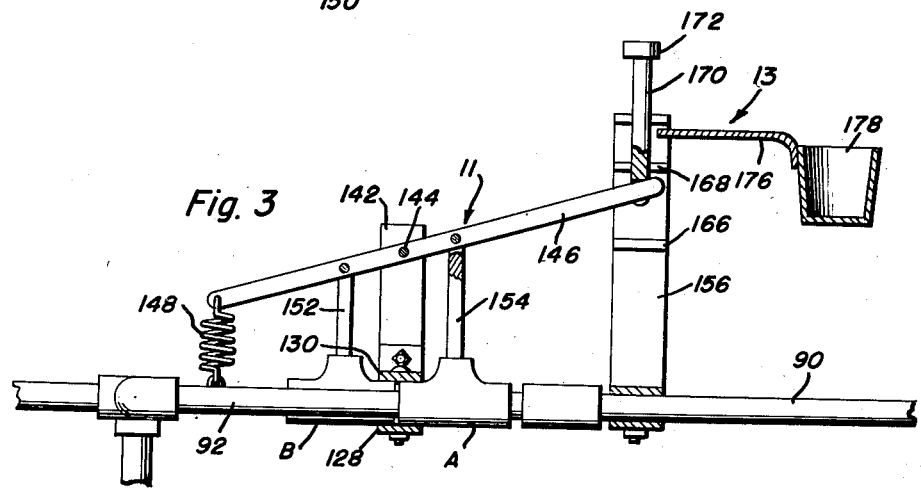
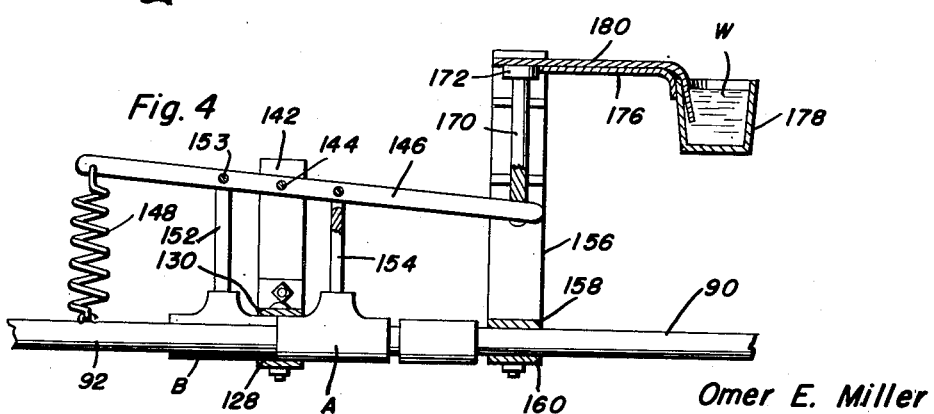
Omer E. Miller
INVENTOR.

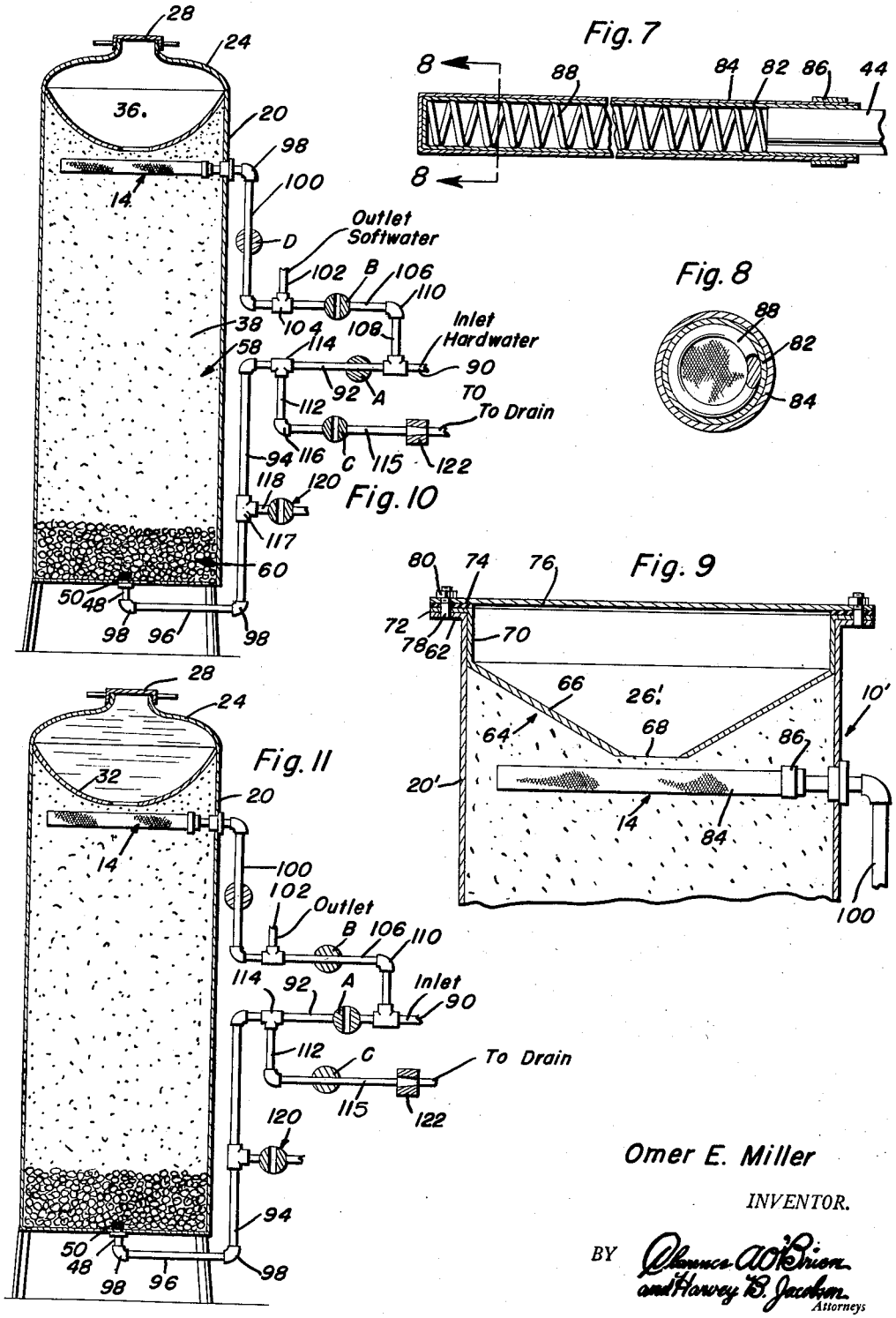

Patented June 15, 1954

2,681,148

UNITED STATES PATENT OFFICE 2,681,148

WATER SOFTENING APPARATUS

Omer E. Miller, Westfield, N. J.

Application April 16, 1951, Serial No. 221,164

8 Claims. (Cl. 210—24)

The present invention relates to improvements in water softening apparatus and more particularly to a water softening apparatus having means for regenerating the water softening material.

An object of the present invention is to provide a water softening apparatus through which hard water can normally circulate to supply water to an outlet for the apparatus and wherein reversed flow through the apparatus can be effected for intermingling a brine solution with the water softening material for regenerating that material.

A further object of the present invention resides in the provision of valve means whereby water can be circulated in a first direction through the water softening apparatus and wherein means is provided for effecting a reversal of flow through the apparatus for a predetermined time interval, whereupon the flow will continue in the first direction.

Still another object of the present invention resides in the novel provision of timing means which is comprised of an absorbent paper which is adapted to maintain an operating plunger in predetermined position whereby a lever means can be retained in a predetermined position for holding the valve means in preselected open and closed positions, and wherein when the absorbent paper has become saturated, the paper will be fracturable whereby the plunger will be released for upward movement, thereby releasing the lever means for pivoting movement so that the closed and open valves will become opened and closed valves respectively.

Another object of the present invention resides in the provision of a novel outlet filter for the softened water, the outlet filter being of resilient form and covered with a fabric material such as Vinyon whereby the resiliency of the outlet permits the same to "breathe" with the material therearound, whereby the outlet will not become clogged.

Still further objects and advantages will become apparent from the detailed description to follow. The best form in which I have contemplated applying my invention is clearly illustrated in the accompanying drawings, wherein:

Figure 1 is a vertical sectional view through a water softening tank and showing the valve means associated therewith in side elevational view;

Figure 2 is a top plan view of the valve means with the associated timing means, the apparatus being shown in the normal softening arrangement;

Figure 3 is a side elevational view of the valve means of Figure 2, with parts broken away;

Figure 4 is a side elevational view similar to Figure 3 but wherein the valve means has been set for reversed flow with the timing means manually set for a predetermined time interval of reversed flow;

Figure 5 is a vertical transverse sectional view taken substantially along the plane of line 5—5 of Figure 1;

Figure 6 is a vertical transverse sectional view taken substantially along the plane of line 6—6 of Figure 1;

Figure 7 is a longitudinal detail sectional view through the filter outlet for the tank of Figure 1;

Figure 8 is a vertical transverse view taken substantially along the plane of line 8—8 of Figure 7;

Figure 9 is a detail sectional view of a modified form of tank structure having a removable salt chamber associated therewith, parts being broken away;

Figure 10 is a vertical sectional view through the water softening tank with the pipes associated therewith being shown in diagrammatic arrangement for normal water softening operation; and Figure 11 is a view similar to Figure 10 but wherein the valves have been moved to the position similar to the arrangement in Figure 4 for regenerating the water softening material of the tank.

Referring more particularly to the drawings, wherein like numerals designate like parts throughout, the numeral 10 designates generally the water softening tank having inlet means 12 and outlet means 14 associated therewith. The numeral 16 designates generally the valve means employed in combination with the water softening tank 10 while the numeral 18 designates generally the timing means associated with the valve means 16.

Looking first at Figure 1, it will be seen that the water softening tank 10 is comprised of a substantially cylindrical shell 20 having a flat bottom wall 22 and a concavo-convex upper wall 24 provided with a centrally disposed, axially bored extension 26. The extension 26 is provided with a closure cap 28 and sealing ring 30 for sealing the upper end of the tank. Fixedly secured within the cylindrical shell 20 and adjacent to the upper end of the tank is a dish-like member 32 formed with a central opening at 34, the dish-like member 32 being secured to the inner wall of the shell 20 by means of weld or the like. It will thus be seen that the water softening tank 10 is divided into a pair of chambers 36 and 38.

Adjacent the upper end of the cylindrical shell 20, an opening is formed at 40. The outlet means 14 is inserted through the opening 40 and a closure plug 42 sealingly engaging the pipe section 24 is fixedly secured within the opening 40, a sealing ring 46 completing the water tight connection.

In the bottom wall 22 of the water softening tank 10, an inlet pipe section 48 is inserted, the inner end of the pipe section 48 having an inlet strainer 50 associated therewith. The entire inlet means 12 is secured within the opening 52 of the bottom wall 22 by means of the closure plug 54 and sealing ring 56.

The chamber 38 of the tank 10 is filled with a softening resin 58, the lower end of the tank being provided with a substantial amount of gravel 60.

Figure 9 shows a modified form of tank structure, but which form functions in substantially the same manner as the form of Figure 1, the tank being designated generally by the numeral 10'. The tank 10' is comprised of a substantially cylindrical shell 20' terminating at its upper end in an outwardly extending flange 62. The bottom end of the tank is substantially the same as in Figure 1. However, the salt chamber 26' is provided by a removable salt receptacle 64. The salt receptacle 64 is provided with a conical section 66 terminating at its lower end in an aperture 68 and having its upper end provided with a cylindrical wall 70 terminating in an outwardly extending flange 72. A sealing ring 74 is engaged over the flange 72 and a removable lid 76 rests on the sealing ring 74, a plurality of bolts 78 and nuts 80 being provided for removably securing the lid 76 to the salt receptacle 64 and tank 10'.

The structure of the outlet means 14, employed in both forms of water softening tanks, is best shown in Figures 7 and 8 as comprising a cylindrical wire cloth member 82 which is engaged over the inner end of the outlet pipe section 44. A filter cloth, preferably Vinyon, a composition consisting of approximately 90% vinyl-chloride and 10% vinyl acetate by weight, designated by the numeral 84 is engaged over the wire cloth 82 and the wire cloth and filter cloth 82 and 84, respectively, are secured on the pipe section 44 by means of the clamping ring 86. A coil spring 88 is disposed within the cylindrical members 82 and 84 for resiliently maintaining the same in their expanded cylindrical form.

The conduit system for the water softening apparatus includes an inlet supply conduit or pipe 90, comprised of sections 92, 94, 96 and 48, all joined by elbow sections 98. The outlet pipe section 44 is connected to pipe sections 100, 102, the pipe section 102 being the soft water outlet for delivery to wherever desired. Elbow sections 98 and T-section 104 are employed for connecting the several pipe sections. An interconnecting conduit comprised of pipe sections 106 and 108, joined by the elbow section 110, interconnect the supply conduit 90 with the outlet conduit 102 by means of the pair of T-connections 104. A drain conduit section 112 is connected to the inlet conduit section 92 by means of the T-fitting 114 and has an outer extension 115 connected thereto by means of the elbow fitting 116.

Looking now at Figure 2, or either of the diagrammatic views Figures 10 and 11, it will be seen that the pipe sections 92, 106 and 115 are each provided with conventional reciprocating type valves A, B and C, respectively. The pipe section 100 provided with a manually controlled conventional valve D, while the pipe section 94 is provided with a T-fitting 117 having a conduit section 118 extending therefrom with a conventional faucet 120 connected thereto for drawing off fluid as desired. The conduit section 115 is provided with a variable restrictor 122, manually controlled by the handle 124.

Valve D and faucet 120 are manually controlled while valves A, B and C are automatically actuated by the actuating means designated generally by the numeral 11, as shown best in Figures 1 through 6.

A fulcrum 126 comprised of first and second U-shaped members 128 and 130 is clampingly engaged on the pipe sections 92, 106 and 115 by means of the studs 132 and nuts 134, bolts 136 and nuts 138 being employed for securing the ends of the U-shaped element 130 to the upstanding legs 140 and 142 of the U-shaped element 128. The upper ends of the legs 140 and 142 are joined by a pivot pin 144 which pivotally supports the lever 146. One end of the lever 146 has a tension spring 148 connected thereto, the other end of the spring 148 being connected to the pipe section 92 for normally urging the lever 146 to a first and normal operating position. Intermediate portions of the lever 146, on opposite sides of the pivot pin 144, have plungers 150, 152 and 154 loosely connected thereto for reciprocation thereby, the plungers being connected to the valves C, B and A, respectively, for actuating the same.

In view of the foregoing, it will be seen that the valves B and C will normally be maintained closed as a result of the normal biasing of the spring 148, whereby flow from the hard water inlet will supply the tank 10 with hard water for normal through the softening material and thence through the outlet 14 and conduit sections to 102.

With the flow through the tank being from the bottom to the top, it will be seen that the hard water will be chemically acted upon by the water softening agent 58 and the soft water will be delivered to the outlet leaving the foreign matter retained within the tank. Of course, the softening resin will become deactivated upon extended use. Consequently, it is necessary to regenerate the softening resin by introducing a brine solution and effecting reversed flow through the tank. The means for reversing the flow through the tank is comprised of the means 11 for actuating the valves to their reversed position. A timing means 13 is associated with the actuating means 11 whereby the valves A, B and C can be held in their reversed positions for a predetermined length of time before returning to their normal positions for normal softening operation.

The timing means 13 is comprised of an upstanding bracket 156 which is clampingly received on the supply conduit 90 by means of the pair of clamped elements 158 and 160, bolts 162 and nuts 164 being employed for securing the bracket 156 to the clamping elements 158 and 160. The bracket 156 is formed with a pair of vertically aligned guides 166 and 168 between which is reciprocably guided the operating plunger 170. The upper end of the operating plunger 170 is formed with an enlarged head 172 which is adapted to pass between the open upper end 174 of the bracket 156 to assume its normal position. The bracket 156 is provided with a longitudinally extending tongue 176 terminating in a water cup 178.

As seen best in Figure 4, when it is desired to effect an alternate arrangement of the valves A, B and C, the lever 146 is downwardly pivoted to the position there shown, whereby the plunger will assume the position within the bracket 156 with the head 172 disposed below the opening 174 in the upper end of the bracket 156. An elongated piece of absorbent paper 180 is carried by the tongue 176 and has one end extending into the water W within the cup 178. The other end of the absorbent paper 180 is disposed below the flanged portion 171 of the bracket 156, thereby covering the opening 174 in the upper end of the bracket 156, in order that the plunger 170 will be retained in its lowermost position with the valve A closed and the valves B and C in their open positions.

It will thus be seen that with the valves arranged as in Figure 4, flow from the inlet hard water will be by-passed through the interconnecting pipe sections 106 and 108 into the outlet conduit sections and from there into the tank 10 by means of the outlet filter. The water within the tank 10 will then pass through the inlet conduit sections 48, 90 and 94 to the drain conduit sections 112 and 114, through the restriction 122 and to the sewerage.

In actual operation, when it is desired to regenerate, the valves A, B and C are arranged as in Figure 4 with the absorbent paper disposed to maintain the plunger 170 in the present position. The valve D is closed and the drain valve 120 is opened to exhaust the pressure within the tank 10. The cap 28 can then be removed from the upper end of the tank and the dry salt introduced into the chamber 36. After the salt is placed in the chamber, valve D is opened, valve 120 is closed, and water is introduced into the tank until the liquid level reaches a point adjacent the upper opening of the salt chamber. The valve D is then closed and the cover to the salt chamber is replaced. Valve D is again opened for flow as shown in Figure 11, the liquid passing from outlet 14, through the tank to drain orifice 122.

The rate at which the salt dissolves and passes through the tank as a brine solution depends upon the bottom opening of the salt chamber and the volume of liquid forced through the tank. Thus, if the flow of liquid through the tank is increased, the amount of brine passing through the tank per unit time will increase as the undissolved salt in the brine becomes dissolved due to the added water. The rate of flow of the brine solution through the tank can be increased by varying the bottom opening of the salt chamber.

It is to be further noted that as a result of the differences in density the brine solution will pass downwardly from the salt chamber and a portion of the incoming water will rise from the outlet 14 into the salt chamber for dissolving the undissolved salt in the brine solution of the salt chamber. After the flow has continued through the circuit for a predetermined length of time the salt chamber will be filled with fresh water and the regeneration will be complete.

At the same time the regeneration is completed, the absorbent paper 180 will become saturated and therefore fracturable. The plunger 170 will therefore fracture the absorbent paper 180 and move upwardly to reverse the positions of the valves A, B and C, thereby effecting normal flow for softening water.

It is to be noted that even though the regeneration process is being effected, a supply of water can be obtained from the outlet conduit section 102, although the supply of water will be hard and directly from the hard water supply section 90.

In view of the foregoing, it is believed that a water softening apparatus has been provided which will accomplish all of the objects hereinabove set forth. Furthermore, in view of the simplicity of operation of the structure of the present invention, further description thereof is deemed unnecessary.

Having described the invention, what is claimed as new is:

1. A water softening apparatus comprising a tank having an inlet connection at its lower end, a soft water outlet means at the upper end of said tank and extending outwardly therefrom, a hard water supply conduit connected to said inlet connection, a drain pipe connected to an intermediate portion of said supply conduit, and an interconnecting pipe providing communication between said supply conduit and said outlet means, and valve means for controlling the flow from said supply conduit to said tank and from said tank to said drain pipe whereby flow through said tank can be selectively reversed, and timing means operatively associated with said valve means for automatically reversing the flow through said tank upon elapse of a predetermined time interval, said timing means including a fulcrumed lever actuating said valve means, a plunger pivotally secured at one end of said lever and a spring loading the other end of said lever, a guide sleeve slidably receiving said plunger and having an annular shoulder at its upper end, a water cup secured to said sleeve adjacent said upper end, said sleeve having a slot adjacent said water cup for the insertion of an absorbent strip, an absorbent strip having one portion received in said slot and abutting said shoulder to maintain the plunger within the sleeve and having its other end disposed in said water cup whereby the plunger will puncture the strip when the strip is saturated by capillary action from the water cup.

2. A water softening apparatus comprising a tank having an inlet connection at its lower end, a soft water outlet means at the upper end of said tank and extending outwardly therefrom, a hard water supply conduit connected to said inlet connection, a drain pipe connected to an intermediate portion of said supply conduit, and an interconnecting pipe providing communication between said supply conduit and said outlet means, and valve means for controlling the flow from said supply conduit to said tank and from said tank to said drain pipe whereby flow through said tank can be selectively reversed, and manually reset timing means operatively associated with said valve means for automatically reversing the flow through said tank upon elapse of a predetermined time interval, said timing means including a fulcrumed lever actuating said valve means, a plunger pivotally secured at one end of said lever and a spring loading the other end of said lever, a guide sleeve slidably receiving said plunger and having an annular shoulder at its upper end, a water cup secured to said sleeve adjacent said upper end, said sleeve having a slot adjacent said water cup for the insertion of an absorbent strip, an absorbent strip having one portion received in said slot and abutting said shoulder to maintain the plunger within the sleeve and having its other end disposed in said water cup whereby the plunger will puncture the strip when the strip is saturated by capillary action from the water cup.

3. A water softening apparatus comprising a tank having an inlet connection at its lower end, a soft water outlet means at the upper end of said tank and extending outwardly therefrom, a hard water supply conduit connected to said inlet connection, a drain pipe connected to an intermediate portion of said supply conduit, and an interconnecting pipe providing communication between said supply conduit and said outlet means, a first valve controlling the flow through said supply conduit, a second valve interposed in said interconnecting pipe for selectively affording communication between said supply conduit and said outlet means, a third valve interposed in said drain pipe, and means for simultaneously actuating said valves for selectively effecting flow from said supply conduit to said tank and out through said outlet means, and from said supply conduit through said interconnecting pipe and outlet means to said tank, out through said inlet connection, through the portion of said supply conduit connecting the tank with said drain pipe and out through said drain pipe, said actuating means comprising a lever pivotally mounted intermediate its ends, a plunger pivotally secured to one end of said lever, the other end of said lever being spring loaded, said second and third valves being operatively connected to the spring loaded end of said lever, said first valve being operatively connected to the plunger end of said lever.

4. A water softening apparatus comprising a tank having an inlet connection at its lower end, a soft water outlet means at the upper end of said tank and extending outwardly therefrom, a hard water supply conduit connected to said inlet connection, a drain pipe connected to an intermediate portion of said supply conduit, and an interconnecting pipe providing communication between said supply conduit and said outlet means, and valve means for controlling the flow from said supply conduit to said tank and from said tank to said drain pipe whereby flow through said tank can be selectively reversed, said last recited means including a first valve controlling the flow through said supply conduit, a second valve interposed in said interconnecting pipe for selectively affording communication between said supply conduit and said outlet means, a third valve interposed in said drain pipe, and means for simultaneously actuating said valves for selectively effecting flow from said supply conduit to said tank and out through said outlet means, and from said supply conduit through said interconnecting pipe and outlet means to said tank, out through said inlet connection, through the portion of said supply conduit connecting the tank with said drain pipe and out through said drain pipe, said actuating means comprising a lever pivotally mounted intermediate its ends, a plunger pivotally secured to one end of said lever, the other end of said lever being spring loaded, said second and third valves being operatively connected to the spring loaded end of said lever, said first valve being operatively connected to the plunger end of said lever.

5. A water softening apparatus comprising a tank having an inlet connection at its lower end, a soft water outlet means at the upper end of said tank and extending outwardly therefrom, a hard water supply conduit connected to said inlet connection, a drain pipe connected to an intermediate portion of said supply conduit, and an interconnecting pipe providing communication between said supply conduit and said outlet means, a first valve controlling the flow through said supply conduit, a second valve interposed in said interconnecting pipe for selectively affording communication between said supply conduit and said outlet means, a third valve interposed in said drain pipe, and means for simultaneously actuating said valves for selectively effecting flow from said supply conduit to said tank and out through said outlet means, and from said supply conduit through said interconnecting pipe and outlet means to said tank, out through said inlet connection, through the portion of said supply conduit connecting the tank with said drain pipe and out through said drain pipe, and timing means operatively associated with said valve means for automatically reversing the flow through said tank upon elapse of a predetermined time interval, said timing and actuating means including a fulcrumed lever actuating said valve means, a plunger pivotally secured to one end of said lever and a spring loading the other end of said lever, a guide sleeve slidably receiving said plunger and having an annular shoulder at its upper end, a water cup secured to said sleeve adjacent said upper end, said sleeve having a slot adjacent said water cup for the insertion of an absorbent strip, an absorbent strip having one portion received in said slot and abutting said shoulder to maintain the plunger within the sleeve and having its other end disposed in said water cup whereby the plunger will puncture the strip when the strip is saturated by capillary action from the water cup.

6. A water softening apparatus comprising a tank having an inlet connection at its lower end, a soft water outlet means at the upper end of said tank and extending outwardly therefrom, a hard water supply conduit connected to said inlet connection, a drain pipe connected to an intermediate portion of said supply conduit, and an interconnecting pipe providing communication between said supply conduit and said outlet means, a first valve controlling the flow through said supply conduit, a second valve interposed in said interconnecting pipe for selectively affording communication between said supply conduit and said outlet means, a third valve interposed in said drain pipe, and means for simultaneously actuating said valves for selectively effecting flow from said supply conduit to said tank and out through said outlet means, and from said supply conduit through said interconnecting pipe and outlet means to said tank, out through said inlet connection, through the portion of said supply conduit connecting the tank with said drain pipe and out through said drain pipe, and manually reset timing means operatively associated with said valve means for automatically reversing the flow through said tank upon elapse of a predetermined time interval, said timing and actuating means including a fulcrumed lever actuating said valve means, a plunger pivotally secured to one end of said lever and a spring loading the other end of said lever, a guide sleeve slidably receiving said plunger and having an annular shoulder at its upper end, a water cup secured to said sleeve adjacent said upper end, said sleeve having a slot adjacent said water cup for the insertion of an absorbent strip, an absorbent strip having one portion received in said slot and abutting said shoulder to maintain the plunger within the sleeve and having its other end disposed in said water cup whereby the plunger will puncture the strip when the strip is saturated by capillary action from the water cup.

7. A water softening apparatus comprising a tank having an inlet connection at its lower end, a soft water outlet means at the upper end of said tank and extending outwardly therefrom, a hard water supply conduit connected to said inlet connection, a drain pipe connected to an intermediate portion of said supply conduit, an interconnecting pipe providing communication between said supply conduit and said outlet means, valve means on said conduit and pipes, a fulcrum supported on said conduit and pipes, a lever pivoted intermediate its ends on said fulcrum, valve stems carried by said lever for selectively opening and closing said valve means, resilient means connected to one end of said lever and said conduit urging said lever toward said conduit, a bracket mounted on said conduit having an opening therethrough, a plunger carried by said other end of said lever slidably disposed in said bracket and adapted to project through said bracket opening, a strip of absorbent paper closing said opening, and a source of liquid for saturating said paper, said plunger penetrating said paper upon saturation thereof and reversing the positioning of said valve stems.

8. A water softening apparatus including a tank, an inlet connection and an outlet means on said tank, a conduit supply and drainage system connected to said inlet connection and said outlet means, valves arranged in a cluster on said conduit system, a fulcrum supported on said system adjacent said valves, a lever pivoted intermediate its ends on said fulcrum, valve stems on said valves operatively connected to said lever on opposite sides of the fulcrum, a spring loading one end of said lever and pivoting the lever in one direction, a bracket mounted on said system and having an opening therein, the other end of said lever being received in said bracket, a plunger pivotally secured to said other end of said lever and adapted to slidably project through said opening in response to said spring load, a water cup carried by said bracket, a strip of absorbent paper inserted between said opening and said plunger to prevent projection of the plunger through the opening, a portion of said strip being disposed in said water cup, said plunger penetrating said strip upon saturation of the strip to reverse the opening and closing of said valves.

References Cited in the file of this patent

UNITED STATES PATENTS

| Number | Name | Date |
| --- | --- | --- |
| 1,154,892 | Slocum | Sept. 28, 1915 |
| 1,333,041 | Slocum | Mar. 9, 1920 |
| 1,452,288 | Caps | Apr. 17, 1923 |
| 1,628,541 | Johnson | May 10, 1927 |
| 1,810,413 | Arman | June 16, 1931 |
| 1,964,302 | Shetter | June 26, 1934 |
| 2,247,964 | Reynolds | July 1, 1941 |
| 2,292,801 | Slidell | Aug. 11, 1942 |
| 2,329,052 | Irwin | Sept. 7, 1943 |
| 2,329,350 | Kaysen | Sept. 14, 1943 |
| 2,347,201 | Lindsay | Apr. 25, 1944 |
| 2,396,809 | Addison | Mar. 19, 1946 |
| 2,627,503 | Anderson | Feb. 3, 1953 |